United States Patent
Gruschko et al.

(10) Patent No.: US 9,002,813 B2
(45) Date of Patent: Apr. 7, 2015

(54) EXECUTION PLAN PREPARATION IN APPLICATION SERVER

(75) Inventors: Boris Gruschko, Heidelberg (DE); Bjoern Friedmann, Rheinmuenster (DE); Christian Mohr, Heidelberg (DE); Florian Foebel, Buerstadt (DE); Martin Strenge, Nussloc (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/335,917

(22) Filed: Dec. 22, 2011

(65) Prior Publication Data

US 2013/0166588 A1 Jun. 27, 2013

(51) Int. Cl.
G06F 7/00 (2006.01)
G06F 17/30 (2006.01)

(52) U.S. Cl.
CPC .................................... *G06F 17/30* (2013.01)

(58) Field of Classification Search
None
See application file for complete search history.

(56) References Cited

U.S. PATENT DOCUMENTS

| | | | |
|---|---|---|---|
| 6,289,355 B1 * | 9/2001 | Haderle et al. | 1/1 |
| 6,466,931 B1 * | 10/2002 | Attaluri et al. | 1/1 |
| 6,708,185 B2 * | 3/2004 | Harris | 1/1 |
| 2003/0033291 A1 * | 2/2003 | Harris | 707/3 |
| 2004/0215626 A1 * | 10/2004 | Colossi et al. | 707/100 |
| 2004/0236722 A1 * | 11/2004 | Waas et al. | 707/2 |
| 2008/0033914 A1 * | 2/2008 | Cherniack et al. | 707/3 |
| 2008/0281846 A1 * | 11/2008 | Hoang et al. | 707/101 |
| 2009/0094193 A1 * | 4/2009 | King et al. | 707/2 |
| 2009/0216709 A1 * | 8/2009 | Cheng et al. | 707/2 |
| 2010/0235335 A1 * | 9/2010 | Heman et al. | 707/703 |
| 2011/0072217 A1 * | 3/2011 | Hoang et al. | 711/130 |
| 2011/0088014 A1 * | 4/2011 | Becker et al. | 717/125 |
| 2011/0231389 A1 * | 9/2011 | Surna et al. | 707/718 |
| 2011/0282851 A1 * | 11/2011 | Sivashanmugam et al. | 707/705 |

OTHER PUBLICATIONS

"Column-Stores vs. Row-Stores: How Different Are They Really?", by Daniel et al., SIGMOD'08, Jun. 9-12, 2008, Vancouver, BC, Canada.*

* cited by examiner

*Primary Examiner* — Debbie Le
*Assistant Examiner* — Hasanul Mobin
(74) *Attorney, Agent, or Firm* — Mintz Levin Cohn Ferris Glovsky and Popeo, P.C.

(57) ABSTRACT

A system and method for execution plan preparation. One or more processors executing an application process of an application server receive a request from a client computer over a network. The one or more processors parse the request to determine one or more components of the request. An execution plan for the request is generated based on the one or more components determined by the parsing, and the execution plan is then sent to a database for execution of the request by a database process.

12 Claims, 4 Drawing Sheets

EXECUTION PLAN PREPARATION IN APPLICATION SERVER

TECHNICAL FIELD

The subject matter described herein relates to improving database and application server performance, and more particularly to a stem and method for generating a query execution plan within the application server process prior to access of the database.

BACKGROUND

Prior to the execution of a query from an application server, a database generates an execution plan. This plan contains operations to be executed in order to ensure the correct results of a query and a proper order of their execution. The generation of the execution plan relies heavily on the presence of database metadata, e.g., a number of data tuples in certain database tables, or the presence of certain database tables and columns. Therefore, the execution plan generation has traditionally been performed in the database process.

Application servers execute large amounts of database queries. The queries are transmitted in form of an SQL statement (String). The database server parses the query, generates the execution plan and executes the query. After the query is processed and the query processing is complete, the results are returned to the application server as a reply for further processing.

For small queries, the effort required to generate the execution plan amounts to a relatively large percentage of the overall query execution effort. Furthermore, the generation of a query execution plan in the database server itself operates on central data structures in the database, heavily contending them.

Some solutions to address these problems involve the use of prepared statements in relational databases. However, the prepared statements only provide a handle to pre-parsed statements, and potentially to the execution plan. The parsing of the queries and execution plan generation must still occur in the database process.

SUMMARY

This document describes a system and method for generating a query execution plan within the application server process. Because the application server runs in a database environment, the metadata necessary for the execution plan is made available via distributed metadata cache, thus de-contending central data structures. The execution plan is generated within the application server, i.e. within an application server process, and submitted to the database or database process for execution.

In one aspect, a computer-implemented method, as well as a system and computer program product executing the method, are disclosed. The method includes receiving, by one or more processors executing an application process of an application server, a request from a client computer over a network. The method further includes parsing, by the one or more processors, the request to determine one or more components of the request, and generating, by the one or more processors, an execution plan for the request based on the one or more components determined by the parsing. The method further includes sending, by the one or more processors, the execution plan to a database for execution of the request by a database process.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, generation of the execution plan in the application server will not contend the database process, as before.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other issues with currently available solutions, methods, systems, articles of manufacture, and the like consistent with one or more implementations of the current subject matter can, among other possible advantages, provide a system and method for generating a query execution plan within the application server process.

The query execution plan is then submitted to the database process for execution. The application server runs as a process within the database system. Because of this, the metadata is made available via distributed metadata cache, thus de-contending central data structures.

Figure 1:
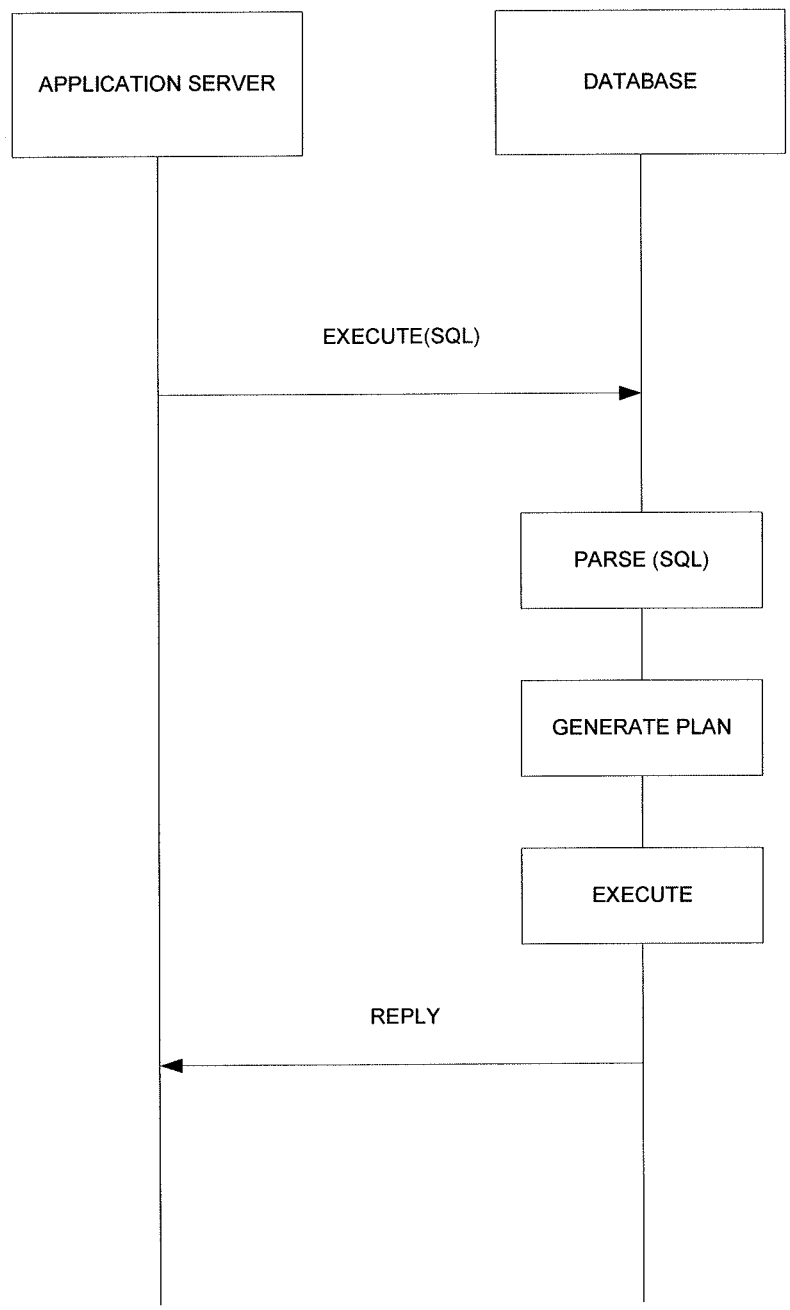
FIG. 1 is a process flow diagram illustrating prior art techniques for database execution plans.
Figure 2:
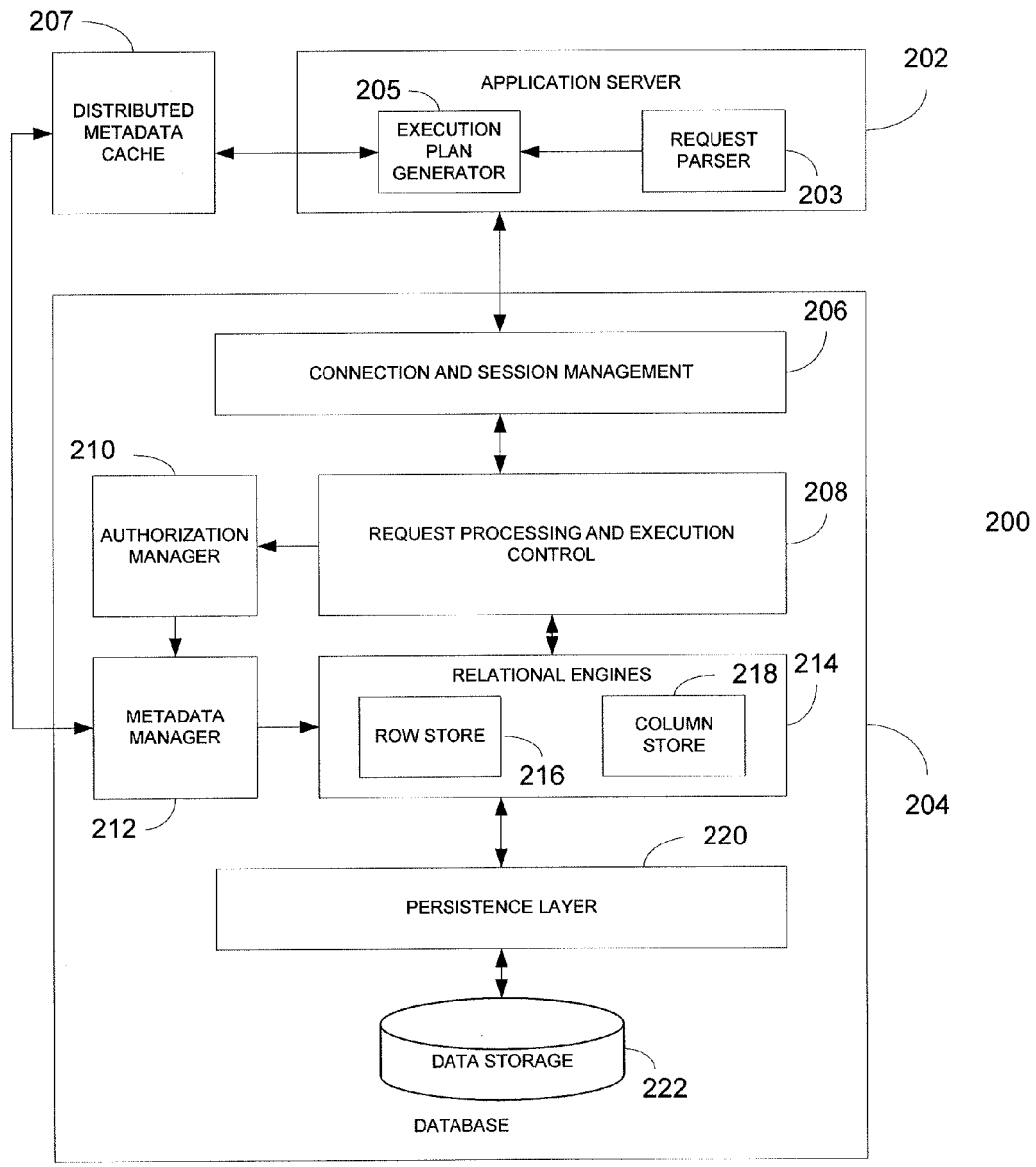
FIG. 2 is a diagram illustrating aspects of a system showing features consistent with implementations of the current subject matter.

FIG. 2 is a block diagram of a database environment 200 having one or more application servers 202 communicating with a database 204. The application server 202 and/or database 204 each represent specific server hardware and/or software processes, and should not be construed as being limited to one or the other. The application server 202 executes queries to the database 204 on behalf of client requests or application processes.

Figure 3:
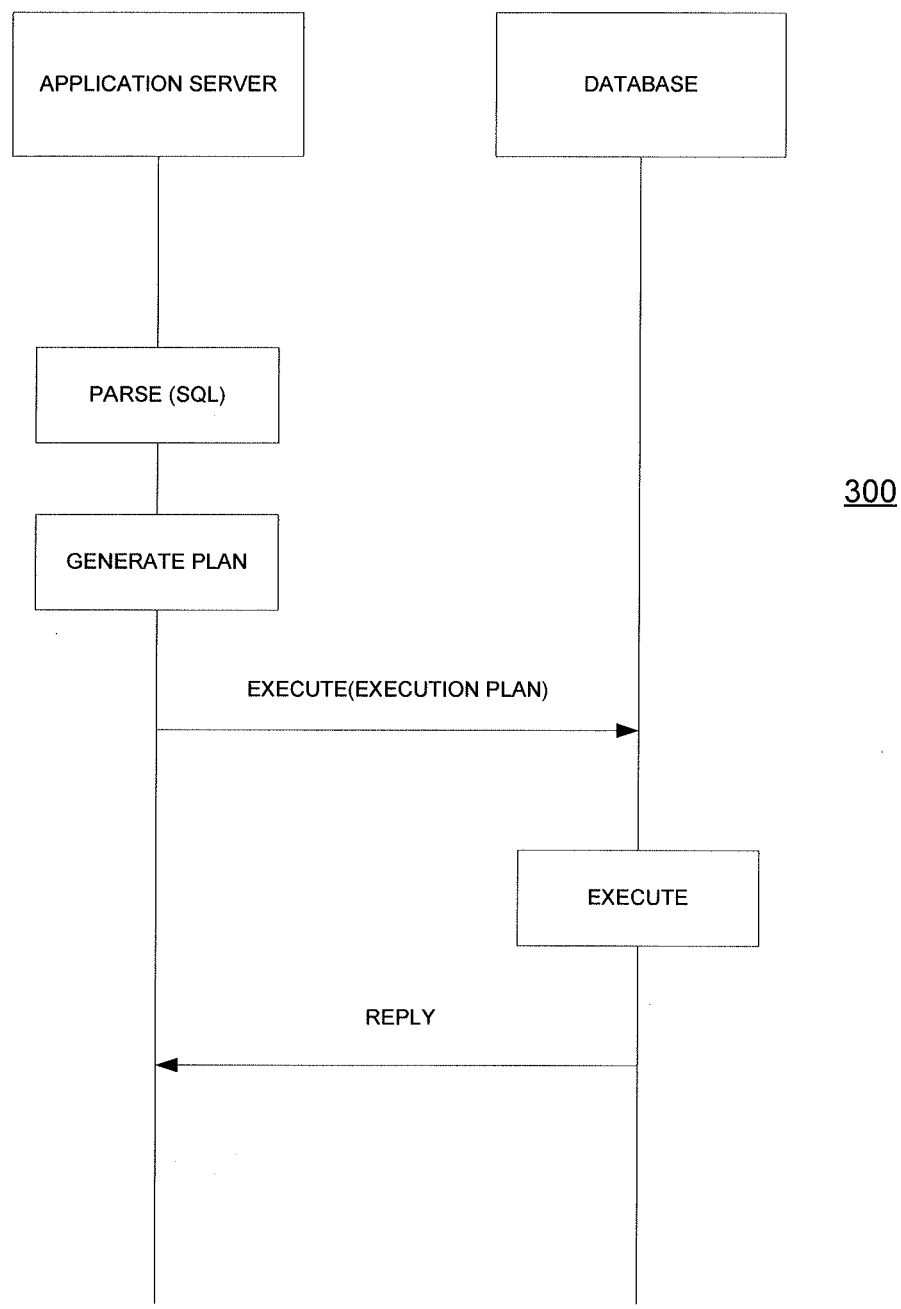
FIG. 3 is a process flow diagram illustrating features consistent with implementations of the current subject matter.

Consistent with implementations of the current subject matter, each application server 202 includes an a request parser 203 that analyzes the client request, such as an SQL statement, parses the client request, and prepares it for dispatching to the responsible component or process of the database 204, in accordance with an execution plan. The execution plan is prepared and optimized by execution plan generator 205, based on the request parser 203. The execution plan generator 205 generates the execution plan with metadata from a distributed metadata cache 207, which is a decentralized cache of metadata that enables the central data structures, including metadata, of the database 204 to be de-contended. As illustrated in FIG. 3, the application server 202 parses the request, generates an execution plan, and sends the fully assembled execution plan to the database 204 for execution.

The database 204 includes a connection and session management component 206 that creates and manages sessions and connections for the database clients such as the one or more application servers 202. For each session, the connection and session management component 206 maintains a set of parameters, such as, for example, auto-commit settings or the current transaction isolation level. Once a session is established, the application server 202 uses SQL statements, or other suitable language such as multidimensional query language (MDX), to communicate with the database 204.

The execution requests are analyzed and executed by a request processing and execution control component 208, which can invoke an authorization manager 210 that checks whether the required privileges to execute the requested operations are met. Metadata in the distributed metadata cache 207 as well as centralized metadata is managed by a metadata manager component 212. The metadata includes a variety of objects, such as definitions of relational tables, columns, views, and indexes, the definition of SQL Script functions and object store metadata.

The database 204 further includes relational engines 214, including an in-memory row store 216 and column store 218. The row store 216 stores data in a row based way, and the column store is a column based in-memory data engine, particularly suited to text analysis and search capabilities. As row based tables and columnar tables can be combined in one SQL statement, the corresponding engines must be able to consume intermediate results created by the other. Each of the row store 216 and column store 218 process data differently: row store operators process data in a row-at-a-time fashion using iteration. Column store operations (such as scan, aggregate and so on) require that the entire column be available in contiguous memory locations. To exchange intermediate results, the row store 216 can provide results to the column store 218 materialized as complete rows in memory, while the column store 218 can expose results using the iteration needed by the row store 216.

The database 204 also includes a persistence layer 220, which is responsible for durability and atomicity of transactions. The persistence layer 220 ensures that the database 204 is restored to the most recent committed state after a restart and that transactions are either completely executed or completely undone. To achieve this goal in an efficient way, the persistence layer 220 uses a combination of write-ahead logs, shadow paging and savepoints. The persistence layer 220 also provides interfaces for writing and reading data from a data storage 222, and contains a logger module that manages a transaction log. Log entries can be written implicitly by persistence layer 220 when data is written via persistence interface or explicitly by using a log interface.

Figure 4:
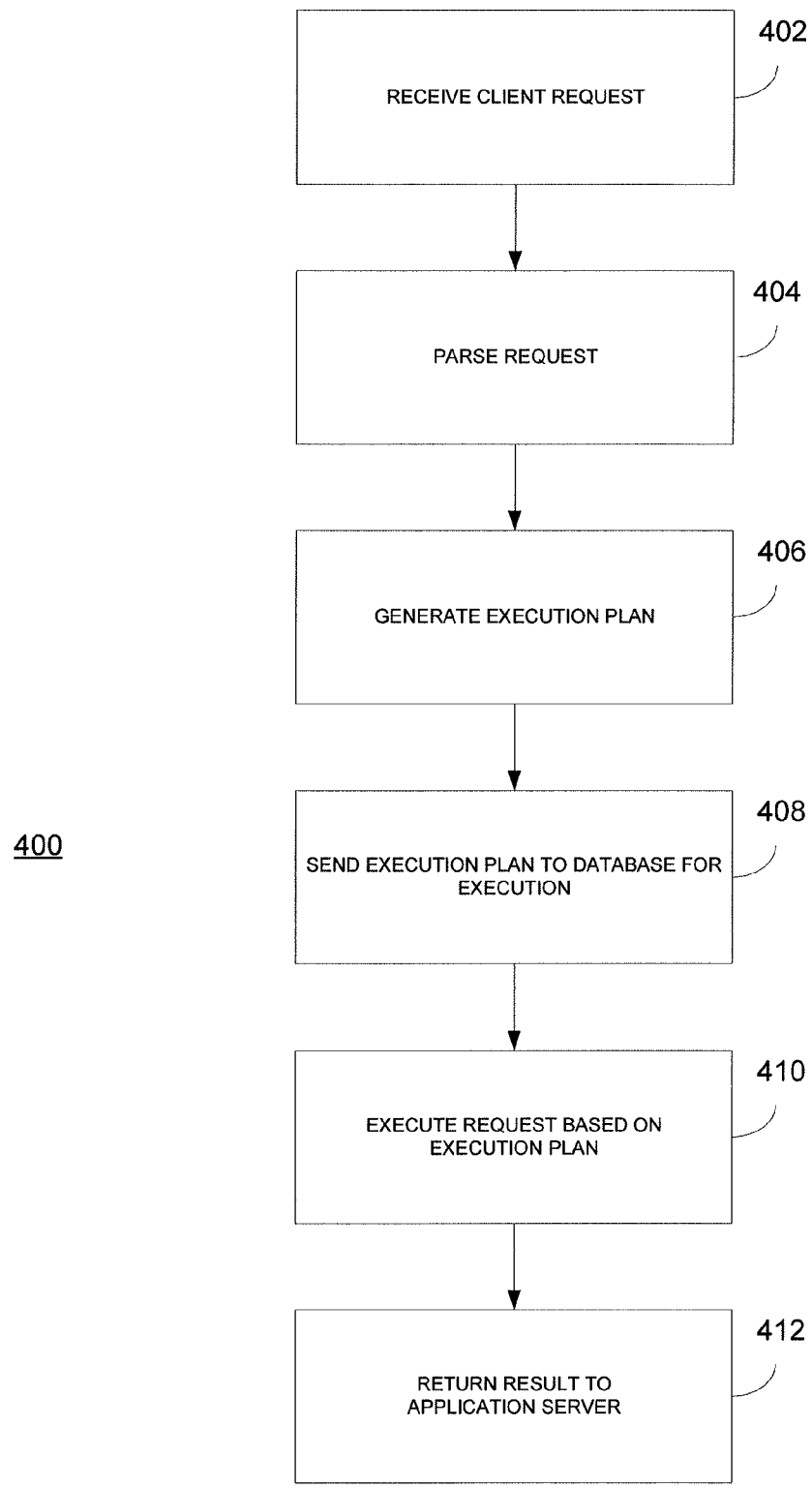
FIG. 4 is a flowchart illustrating aspects of a method consistent with implementations of the current subject matter When practical, similar reference numbers denote similar structures, features, or elements.

FIG. 4 is a flowchart of a method 400 of execution plan preparation in an application server, in accordance with implementations described herein. At 402, a client request is received by an application server. The client request can be in the form of an SQL query or other format of request. At 404, the request is parsed in the application server to determine the applicable component within the database environment to which each parsed part of the request is to receive the part. At 406, the application server generates an execution plan for processing the request as parsed, and based on metadata related to the request that is provided in a distributed metadata cache.

At 408, the execution plan is sent by the application server for execution by the database, i.e. for processing the request according to the execution plan. At 410, the database executes the request based on the execution plan. At 412, the database returns a result of the execution to the application server.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, by one or more data processors executing an application process of an application server, a request from a client computer over a network;
parsing, by the one or more data processors, the request to determine one or more components of the request;
generating, by the one or more data processors, an execution plan for the request based on the one or more components determined by the parsing; and
sending, by the one or more data processors, the execution plan to a database for execution of the request by a database process;
wherein the execution plan is generated with metadata from a distributed metadata cache in the application server and the distributed metadata cache is remote from the application server and is accessible by a plurality of other application servers for execution plan generation, the metadata comprising definitions of relational tables, columns, views, and indexes, definitions of SQL script functions, and object store metadata;
wherein the database comprises a relational engine that includes a row store and a column store, the row store processes data in a row-at-a-time fashion using iteration, and the column store is a column based in-memory data engine in which column store operations require that an entire column be available in contiguous memory locations;
wherein the database comprises a persistence layer responsible for durability and atomicity of transactions, the persistence layer ensuring that the database is restored to a most recent committed state after a restart, the persistence layer providing interfaces for writing and reading data from data storage; and
wherein the database comprises a logger module that manages a transaction log such that log entries are written implicitly by the persistence layer when data is written via persistence interface or explicitly by using a log interface;
wherein the row store provides results to the column store materialized as complete rows in memory, while the column store exposes results using the iteration required by the row store.

2. The method in accordance with claim 1, further comprising executing, by the one or more data processors, the request by the database process.

3. The method in accordance with claim 2, further comprising receiving, by the one or more data processors executing the application process and from the database process, a reply representing the executed request.

4. The method in accordance with claim 1, wherein the distributed metadata cache is a decentralized cache of metadata that enables central data structures of the database to be de-contended.

5. A non-transitory computer program product storing instructions which, when executed by at least one data processor forming part of at least one computing system, result in operations comprising:
receiving a request from a client computer over a network;
parsing the request to determine one or more components of the request;
generating an execution plan for the request based on the one or more components determined by the parsing; and
sending the execution plan to a database for execution of the request by a database process;
wherein the execution plan is generated with metadata from a distributed metadata cache in the application server and the distributed metadata cache is remote from the application server and is accessible by a plurality of other application servers for execution plan generation, the metadata comprising definitions of relational tables, columns, views, and indexes, definitions of SQL script functions, and object store metadata;
wherein the database comprises a relational engine that includes a row store and a column store, the row store processes data in a row-at-a-time fashion using iteration, and the column store is a column based in-memory data engine in which column store operations require that an entire column be available in contiguous memory locations;
wherein the database comprises a persistence layer responsible for durability and atomicity of transactions, the persistence layer ensuring that the database is restored to a most recent committed state after a restart, the persistence layer providing interfaces for writing and reading data from data storage; and
wherein the database comprises a logger module that manages a transaction log such that log entries are written implicitly by the persistence layer when data is written via persistence interface or explicitly by using a log interface;

wherein the row store provides results to the column store materialized as complete rows in memory, while the column store exposes results using the iteration required by the row store.

6. The computer program product in accordance with claim 5, wherein the operations further comprise: executing the request by the database process.

7. The computer program product in accordance with claim 6, wherein the operations further comprise: receiving, from the database process, a reply representing the executed request.

8. The computer program product in accordance with claim 5, wherein the distributed metadata cache is a decentralized cache of metadata that enables central data structures of the database to be de-contended.

9. A system comprising:
   at least one data processor forming part of at least one computing system; and
   memory storing instructions which, when executed by the least one data processor forming part of at least one computing system, result in operations comprising:
     receiving a request from a client computer over a network;
     parsing the request to determine one or more components of the request;
     generating an execution plan for the request based on the one or more components determined by the parsing; and
     sending the execution plan to a database for execution of the request by a database process;
   wherein the execution plan is generated with metadata from a distributed metadata cache in the application server and the distributed metadata cache is remote from the application server and is accessible by a plurality of other application servers for execution plan generation, the metadata comprising definitions of relational tables, columns, views, and indexes, definitions of SQL script functions, and object store metadata;
   wherein the database comprises a relational engine that includes a row store and a column store, the row store processes data in a row-at-a-time fashion using iteration, and the column store is a column based in-memory data engine in which column store operations require that an entire column be available in contiguous memory locations;
   wherein the database comprises a persistence layer responsible for durability and atomicity of transactions, the persistence layer ensuring that the database is restored to a most recent committed state after a restart, the persistence layer providing interfaces for writing and reading data from data storage; and
   wherein the database comprises a logger module that manages a transaction log such that log entries are written implicitly by the persistence layer when data is written via persistence interface or explicitly by using a log interface;
   wherein the row store provides results to the column store materialized as complete rows in memory, while the column store exposes results using the iteration required by the row store.

10. The system in accordance with claim 9, wherein the operations further comprise: executing the request by the database process.

11. The system in accordance with claim 9, wherein the operations further comprise: receiving, from the database process, a reply representing the executed request.

12. The system in accordance with claim 9, wherein the distributed metadata cache is a decentralized cache of metadata that enables central data structures of the database to be de-contended.

* * * * *